H. M. ENGLE.
HOE.
No. 173,399. Patented Feb. 15, 1876.
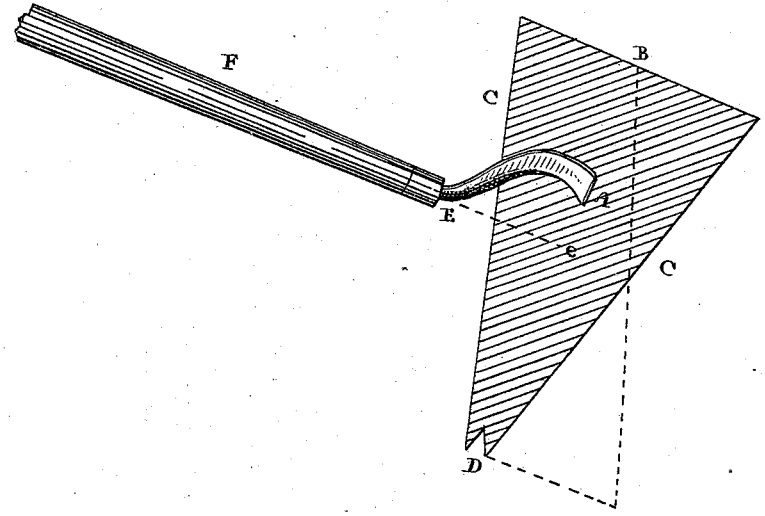
WITNESSES
INVENTOR.

UNITED STATES PATENT OFFICE.

HENRY M. ENGLE, OF MARIETTA, PENNSYLVANIA.

IMPROVEMENT IN HOES.

Specification forming part of Letters Patent No. 173,399, dated February 15, 1876; application filed January 6, 1876.

*To all whom it may concern:*

Be it known that I, HENRY M. ENGLE, of Marietta, in the county of Lancaster and State of Pennsylvania, have invented certain Improvements in Weeding and Garden Hoes, of which the following is a specification, reference being had to the accompanying drawing, and to the letters of reference marked thereon and making a part of the same.

The construction of my improved hoe is clearly shown, in perspective, in said drawing. A brief explanation will enable those skilled in the art to make and use the same.

The object in view is so to shape and construct a single garden implement which shall meet the various demands taught by experience so essentially necessary for hoeing, scraping to or from you, picking out weeds, and cultivate plants generally, and which shall be light, cheap, durable, and efficient in all positions.

A straight edge is always preferable to curved edges for most purposes; hence my hoe has three plain or straight sides. B forms the base of an acute triangle, the sides c of which are each, say, twice the length, at an angle of about seventy-five degrees, and have the end or point D bidentate, as shown. The handle F is inserted opposite the center of the hoe, in a line with e, and curved upward by the connection E, and affixed above the center, at A.

Thus shaped and connected, made of steel plate of the desired size, we have a combination that makes this hoe peculiarly advantageous in practice or use. Its structure adapts it admirably for all the varied purposes of hoeing, scraping, pushing, hilling, and weeding, supplying the place of a wide or narrow hoe, right or left bayonet-hoe, and weeder for picking out grass or the loosened weeds with the deeply-notched or two-toothed point.

I am aware that in Patent No. 102,891 of May 10, 1870, a peculiar combination of curves in the blade is claimed as of great advantage, terminated by a single point, and winged or heart shaped at the opposite end, and in which a hoe is claimed having a circular blade between certain points, and convex at its center, with convave wings, &c. I disclaim all curves in the blade. Nor do I claim any novelty in the insertion of the handle by its curved shank, for such are common, as well as blades of various forms, such as rounded above and pointed at the other end, or having parallel sides, and a central large notch on its cutting-edge; but I am not aware that a hoe has ever been made and used shaped and constructed as shown and set forth; therefore

What I claim as a new article of manufacture is—

A hoe having three straight sides, B C C, forming an acute triangle, with its apex D two-toothed, the whole constructed substantially as and for the purpose specified.

HENRY M. ENGLE.

Witnesses:
W. B. WILEY,
JACOB STAUFFER.